United States Patent
Ewanchuk et al.

(10) Patent No.: US 9,692,832 B2
(45) Date of Patent: Jun. 27, 2017

(54) SYSTEM AND METHOD FOR CONTROLLING CONNECTION TIMEOUT IN A COMMUNICATION NETWORK

(71) Applicant: BlackBerry Limited, Waterloo (CA)

(72) Inventors: Andrew John Ewanchuk, Baden (CA); Darrell Reginald May, Waterloo (CA); Ronesh Puri, Dundas (CA)

(73) Assignee: BlackBerry Limited, Waterloo, Ontario (CA)

( * ) Notice: Subject to any disclaimer, the term of this patent is extended or adjusted under 35 U.S.C. 154(b) by 198 days.

(21) Appl. No.: 13/754,231

(22) Filed: Jan. 30, 2013

(65) Prior Publication Data
US 2014/0115150 A1    Apr. 24, 2014

Related U.S. Application Data

(60) Provisional application No. 61/717,863, filed on Oct. 24, 2012.

(51) Int. Cl.
*H04L 29/08* (2006.01)
*H04W 76/04* (2009.01)
*H04L 12/26* (2006.01)

(52) U.S. Cl.
CPC ......... *H04L 67/145* (2013.01); *H04W 76/045* (2013.01); *H04L 43/0811* (2013.01); *H04L 67/143* (2013.01)

(58) Field of Classification Search
USPC ....................................................... 703/224
See application file for complete search history.

(56) References Cited

U.S. PATENT DOCUMENTS

| 4,941,089 A * | 7/1990 | Fischer | H04L 29/00 370/419 |
| 7,574,495 B1 * | 8/2009 | Rajagopalan | H04L 69/18 370/392 |
| 7,664,991 B1 * | 2/2010 | Gunda et al. | 714/43 |

(Continued)

OTHER PUBLICATIONS

European Extended Search Report; Application No. 13153342.4; Feb. 10, 2015; 9 pages.

(Continued)

*Primary Examiner* — Backhean Tiv
(74) *Attorney, Agent, or Firm* — Conley Rose, P.C.; J. Robert Brown, Jr.; Albert A. Abbou

(57) ABSTRACT

A client device configured to access a remote device via a communication network. The client device is configured to: a) detect a termination of a network connection to the remote device and b) in response to detecting the termination of the network connection, record an idle time duration associated with the network. The client device repeats a) and b) until a plurality of idle time durations have been recorded. The client device then determines from the plurality of idle time durations a timeout value associated with the network and sets a transmission period of a keep-alive signal transmitted from the client device to the remote device based on the determined timeout value. The client device transmits the determined timeout value and information identifying the network to a timeout value server that may be accessed by other client devices.

24 Claims, 4 Drawing Sheets

(56) References Cited

U.S. PATENT DOCUMENTS

| | | | |
|---|---|---|---|
| 8,745,245 B1* | 6/2014 | Bullock | H04L 12/2647 709/227 |
| 2002/0071436 A1* | 6/2002 | Border | H04B 7/18582 370/395.32 |
| 2002/0174207 A1* | 11/2002 | Battou | G06F 8/65 709/223 |
| 2003/0084161 A1* | 5/2003 | Watson | H04L 69/16 709/227 |
| 2004/0177276 A1* | 9/2004 | MacKinnon | H04L 63/0263 726/5 |
| 2005/0188098 A1 | 8/2005 | Dunk | |
| 2005/0209804 A1* | 9/2005 | Basso | H04L 69/28 702/79 |
| 2007/0140159 A1* | 6/2007 | Eronen | H04L 12/12 370/328 |
| 2008/0205288 A1* | 8/2008 | Herzog | H04L 12/2697 370/252 |
| 2009/0172182 A1* | 7/2009 | Yoon | H04L 65/80 709/231 |
| 2009/0210485 A1* | 8/2009 | Dunk | H04L 67/14 709/203 |
| 2009/0240824 A1* | 9/2009 | Rekhtman | 709/230 |
| 2009/0323718 A1* | 12/2009 | Oren-Dahan | H04L 63/029 370/466 |
| 2010/0312899 A1 | 12/2010 | Herzog et al. | |
| 2012/0008536 A1* | 1/2012 | Tervahauta | H04L 43/0811 370/311 |
| 2012/0185585 A1* | 7/2012 | Bhate | H04L 63/1458 709/224 |
| 2012/0230329 A1* | 9/2012 | Morris | 370/389 |
| 2013/0246641 A1* | 9/2013 | Vimpari | H04L 67/142 709/228 |
| 2014/0068044 A1* | 3/2014 | McKinney | H04L 41/0816 709/223 |
| 2014/0078968 A1* | 3/2014 | Korhonen et al. | 370/328 |
| 2014/0115150 A1* | 4/2014 | Ewanchuk | H04W 76/045 709/224 |
| 2015/0120915 A1* | 4/2015 | Erb | H04L 63/20 709/224 |

OTHER PUBLICATIONS

European Examination Report; Application No. 13153342.4; Mar. 9, 2017; 5 pages.

* cited by examiner

US 9,692,832 B2

SYSTEM AND METHOD FOR CONTROLLING CONNECTION TIMEOUT IN A COMMUNICATION NETWORK

CROSS-REFERENCE TO RELATED APPLICATION AND CLAIM OF PRIORITY

The present application is related to U.S. Provisional Patent No. 61/717,863, filed 24 Oct. 2012, entitled "System And Method For Controlling Connection Timeout In A Communication Network". Provisional Patent No. 61/717, 863 is assigned to the assignee of the present application and is hereby incorporated by reference into the present application as if fully set forth herein. The present application hereby claims priority under 35 U.S.C. §119(e) to U.S. Provisional Patent No. 61/717,863.

TECHNICAL FIELD

The present application relates generally to wireless communication and, more specifically, to techniques for maintaining persistent connections in a wireless or wired network

BACKGROUND

It is desirable to maintain a persistent connection between a client device (i.e., a cell phone) and a web-server in order to reduce the overhead needed to re-establish the connection. This is particularly true in connections made over the Hypertext Transfer Protocol (HTTP) and in wireless networks. However, Network Address Translation (NAT) gateways and other equipment that lie along the connection pathway may terminate or drop the connection in the event that the connection goes idle beyond a predefined period of time (i.e., a "timeout" event).

To prevent a NAT gateway from terminating the connection, a client device may periodically transmit to the web server a "keep-alive" packet. A keep-alive packet does not actually include any transactional information and has no effect of the state of the data between the client device and the web-server. A keep-alive packet merely prevents a timeout from occurring so that the NAT gateway does not terminate or drop the connection. Client devices often aggressively transmit keep-alive packets, without any regard to the actual parameters used by the NAT gateway, and thereby implement a universal strategy to keep the connection open.

However, these prior art methods are undesirable in battery-operated devices, where aggressive delivery of keep-alive packets may quickly drain the battery. The prior art methods of maintaining persistent connections are also ideally suited to channels where bandwidth is not constrained. Thus, in bandwidth-constrained mediums, such as wireless network channels, this strategy is wasteful of precious bandwidth.

The present disclosure hereby incorporates by reference the disclosure of U.S. Pat. No. 7,426,569 in its entirety as if fully set forth herein. U.S. Pat. No. 7,426,569 discloses apparatuses and methods for determining the timeout of a network gateway and setting the period of a keep-alive signal in order to maintain a persistent connection. However, it is desirable to provide further apparatuses and methods for maintaining a persistent connection in a communication network. It is particularly desirable to provide further apparatuses and methods for maintaining a persistent connection in a wireless network.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
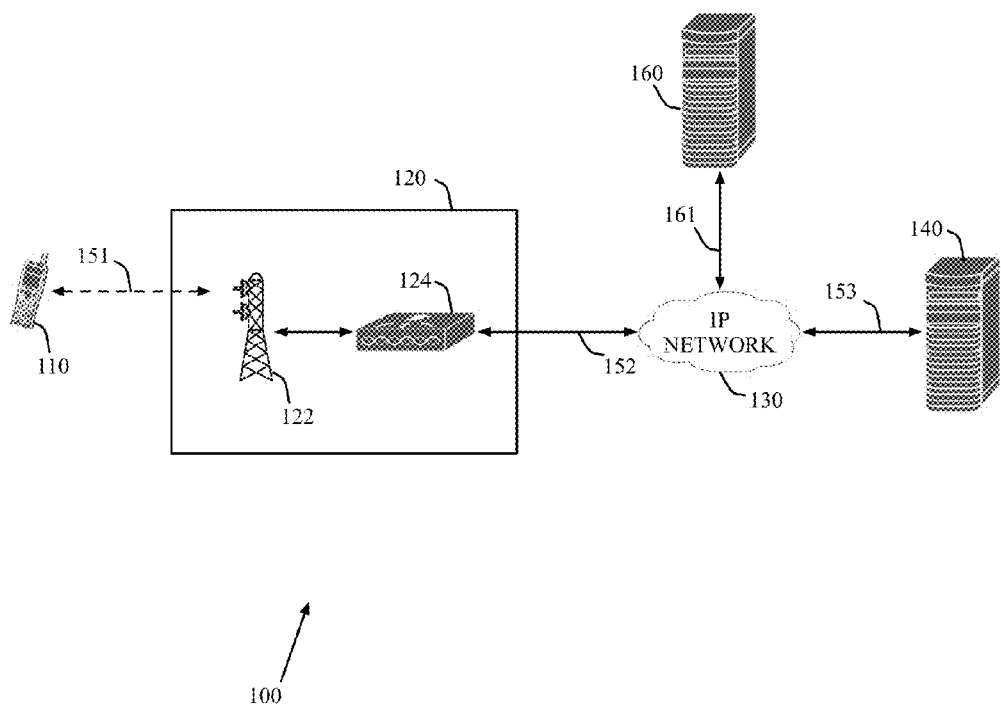
FIG. 1 illustrates a system for maintaining a persistent network connection according to an embodiment of the disclosure.

FIGS. 1 through 4, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless or wired client device or wireless or wired network.

Networks, especially cellular networks, have various timeout values for TCP connections. Normally, it is the responsibility of an application on a client device (e.g., a cellular device) to figure out the timeout values of a network gateway or other device and to then set its own internal timers to prevent a timeout. However, this is wasteful, since every application or framework must handle this same function. This unnecessarily uses up device resources (e.g., battery-life, threads, timers, CPU time).

According to the principles of the present disclosure, the keep-alive logic in the client device (CD) may be implemented further down in the network stack, below the application layer. Accordingly, the TCP function in a client device may be configured to maintain a system-wide list of TCP connections for a wireless network (or a wired network), as well as a table of idle time durations on the connection. When traffic is detected, the client device resets the idle time start. When traffic ceases, the idle time begins incrementing. When a thread is forcibly disconnected, the client device records the total idle time duration. After X disconnections have occurred, the client device examines the collection of idle time durations. If the client device determines that Y of Z sample connections were reset after T seconds of idle time with a margin of error of +/−S seconds, then the client device may adjust the system default TCP keep-alive value to be T-M seconds, where M is a buffer value to ensure the client device transmits keep alive packets at a periodic rate that is consistently below the timeout value.

It is not required that the CD timeout control functions described in the preceding paragraph be implemented in the network stack. Alternatively, the keep-alive logic may be implemented, for example, in the application layer or the sockets layer, which is located between the TCP stack and the application layer.

In the descriptions below, methods and apparatuses for maintaining a network connection according to the principles of the present disclosure are depicted in a wireless network implementation. However, this is by way of example only and should not be construed to limit the scope of this disclosure or the claims that follow. It will readily be understood that methods and apparatuses for maintaining a network connection described herein are also readily adaptable for use in various types of wired networks, including, for example, an Ethernet-based wired communication network. Additionally, the methods and apparatuses described above are depicted in a cellular network implementation. Again, this is by way of example only and should not be construed to limit the scope of the disclosure or the claims that follow. The methods and apparatuses for maintaining a network connection described herein are also readily adaptable for use in various other types of wireless networks, including non-cellular radio access technologies (RATs), such as WiFi network implementations. The methods and apparatuses described herein are also readily adaptable for use in mixed network topologies than comprise both wired portions and wireless portions.

As used herein, the term "client device" may be used to refer to any type of terminal device that communicates over a wired or wireless network with a web server or other remote system. For example, a client device may be any mobile device capable of wireless communication that typically has its own power supply, such as a cellular and/or WiFi-enabled telephone, smartphone or tablet. The client device may or may not have a telephone functionality. However, it is to be understood that a client device need not be battery-operated and/or may be implemented as another type of client device, such as a desktop computer or a laptop with wireless 802.11 or Bluetooth capabilities or the like. In another embodiment, a client device may be desktop computer, a vending machine, a manufacturing machine, or a similar system that is coupled directly or indirectly to a wired network, such as an Ethernet network. Thus, the client device may be either a stationary terminal or a truly mobile device. It also should be understood that the remote system need not be a web-server, but may be any type of communication node that supports a connection with a client device.

FIG. 1 illustrates system 100, which maintains a persistent network connection according to an embodiment of the disclosure. System 100 includes at least one client device 110 that connects to a service provider node 120 via a wireless link 151. Node 120 includes a wireless base station 122 that interacts with client device 110 via link 151 and a NAT gateway 124. In turn, gateway 124 connects to the Internet 130 via a backhaul link 152. Backhaul link 152 can be a T1 line, a T3 line, or any other suitable link for connecting node 120 to Internet 130. Internet 130 is connected to a remote device, namely web-server 140, via a second backhaul link 153.

In at least some embodiments, at least a portion of the connection between client device 110 and web-server 140 is bandwidth-constrained. In system 100, since link 151 is a wireless connection that may need to serve a plurality of client device 110, then link 151 is bandwidth constrained in relation to backhaul 152, backhaul 153 and the other elements that compose the connection between client device 110 and web-server 140. Such bandwidth constraints can thus interfere with the speed with which user operating client device 110 can access Internet 130 and web-server 140. Such constraints become particularly acute when a plurality of client devices similar to client device 110 attempt to access link 151. Furthermore, judicious use of link 151 by client device 110 is desirable due to the fact that client device 110 is battery operated.

NAT gateway 124 is based on standard NAT technology and thus allows a multiple number of client device 110 connected to node 120 to connect to Internet 130 though a public Internet Protocol (IP) address assigned to NAT gateway 124. Accordingly, client device 110 (and other clients connected to node 120) will typically have a private IP address, while NAT gateway 124 will have a public IP address accessible to any party on Internet 130. Thus, as client device 110 accesses Internet 130, web-server 140 will communicate with client device 110 via gateway 124, with gateway 124 translating IP addresses during such communication. In an exemplary embodiment, client device 110 may have the private IP address <10.0.0.2>, gateway may have the private IP address <10.0.0.1> and the public IP address of <50.0.0.1>, and web-server 140 has the public IP address <62.0.0.1>.

Like existing NAT gateways, gateway 124 is thus also configured to automatically terminate idle connections between client device 110 and Internet 130 in order to free-up resources for NAT gateway 124. Client device 110 is configured to maintain a connection between client device 110 and web-server 140 notwithstanding the automatic termination feature of gateway 124. More particularly, client device 110 is configured to send keep-alive packets during an idle communication period to web-server 140 according to a variable criteria, such keep-alive packets being intended to prevent gateway 124 from dropping the connection between client device 110 and web-server 140, but without changing the state of data in client device 110 or web-server 140. Such a keep-alive packet can be any suitable packet that achieves this result, such as a "no-op" command, a command that generates a non-critical error result in the server or a command designed into the application level protocol as a keep-alive mechanism. In one embodiment, the variable criterion is based on a time period that is arrived upon iteratively. The iterations are considered complete when a time period is established that is substantially close to the maximum amount of time that NAT gateway 124 will allow to lapse before terminating the connection between client device 110 and web-server 140.

In one embodiment of the disclosure, system 100 further comprises timeout values server 160. CD 110 is configured to store timeout values for connections between CD 110 and remote devices (e.g., web-server 140) that are terminated after too much idle time without transmission of a keep-alive packet. CD 110 is further configured to transmit from time to time to server 160 the stored timeout values associated with the particular network. The timeout values are shared with other client devices that connect to the same network, thereby enabling the other client devices to quickly determine the correct period for transmitting keep-alive packets. For example, if a second CD 110A joins the same network, the second CD 110A may send a request message to server 160 that identifies the network over which it is connected. Server 160 can then retrieve the correct timeout value for that network and transmit the retrieved timeout value back to the second CD 110A. The second CD 110A can then determine and configure the correct period for transmitting keep-alive packets while connected to that network, without having to perform an extensive search algorithm as in the prior art. Alternatively, the server 160 can provision the device CD 110A with keep-alive information for all networks belonging to the carrier that the device is associated with.

Figure 2:
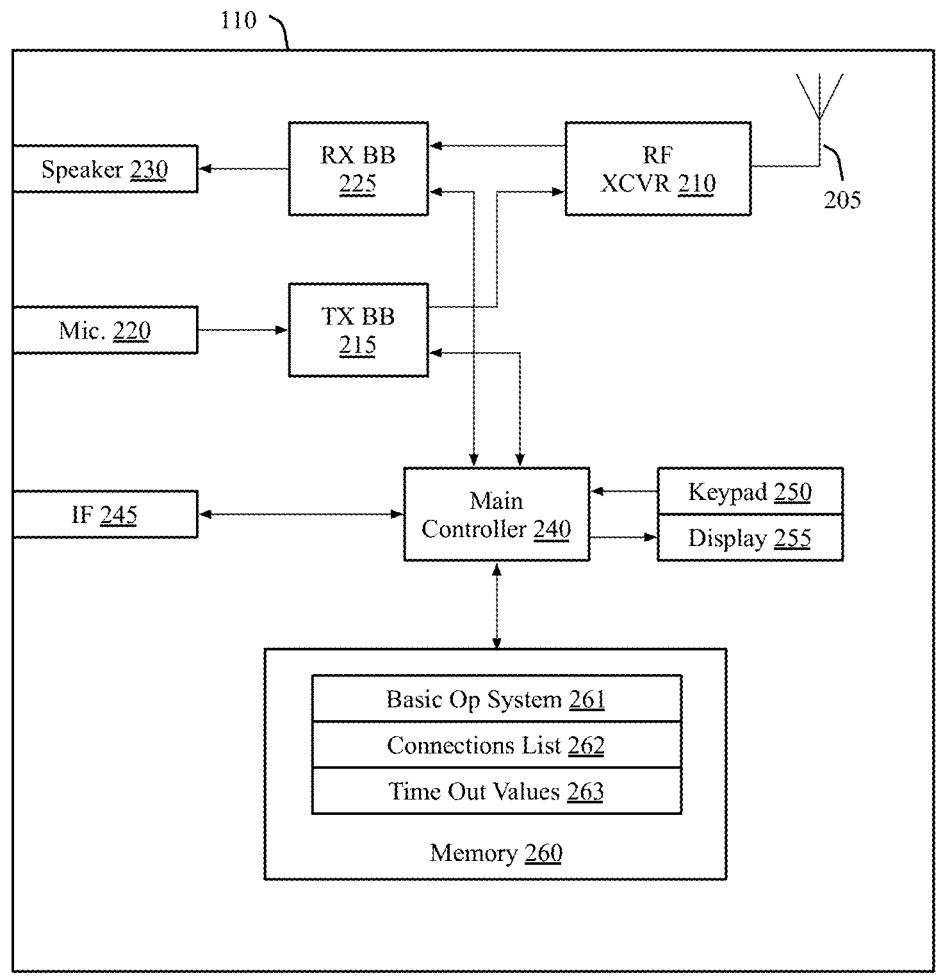
FIG. 2 illustrates exemplary client device according to an embodiment of the disclosure.

FIG. 2 illustrates exemplary client device (CD) 110 according to an embodiment of the disclosure. CD 110 comprises at least one antenna 205, radio frequency (RF) transceiver (XCVR) 210, transmitter baseband (TX BB) processing circuitry 215, microphone 220, and receiver baseband (RX BB) processing circuitry 225. CD 110 also comprises speaker 230, main controller 240, input/output (I/O) interface (IF) 245, keypad 250, display 255, and memory 260. Memory 260 stores basic operating system (OS) program 261, connections list 262 and timeout values table 263, and other data (not shown).

Radio frequency transceiver 210 receives from antenna 205 an incoming RF signal transmitted by a base station of wireless network 100. Radio frequency transceiver 210 comprises receiver circuitry configured to operate in cells associated with one or more types of radio access technology (RAT) networks (e.g., GSM, UTRAN, E-UTRAN, etc.). Radio frequency transceiver 210 down-converts the incoming RF signal to produce an intermediate frequency (IF) or a baseband signal. The IF or baseband signal is sent to RX BB processing circuitry 225, which may produce a processed baseband signal by, for example, filtering and digitizing the received baseband or IF signal, additional filtering, and, if necessary, demodulation and/or decoding. Receiver baseband (RX BB) processing circuitry 225 transmits the processed baseband signal to speaker 230 (i.e., voice data) or to main controller 240 for further processing (e.g., web browsing).

Transmitter baseband (TX BB) processing circuitry 215 may receive analog or digital voice data from microphone 220 or other outgoing baseband data (e.g., web data, e-mail, interactive video game data) from main controller 240. TX BB processing circuitry 215 may encode, modulate, multiplex, and/or digitize the outgoing baseband data to produce a processed baseband or IF signal. Radio frequency transceiver 210 receives the outgoing processed baseband or IF signal from TX BB processing circuitry 215. Radio frequency transceiver 210 up-converts the baseband or IF signal to a radio frequency (RF) signal that is transmitted via antenna 205.

Main controller 240 may comprise any device, system or part thereof that controls at least one operation. Such a device may be implemented in hardware, firmware or software, or some combination of at least two of the same. Main controller 240 may be a microprocessor or a microcontroller. Memory 260 is coupled to main controller 240. Part of memory 260 may comprise a random access memory (RAM) and another part of memory 260 may comprise a non-volatile memory, such as Flash memory.

Main controller 240 executes basic operating system (OS) program 261 stored in memory 260 in order to control the overall operation of CD 110. In one such operation, main controller 240 controls the reception of forward channel signals and the transmission of reverse channel signals by radio frequency transceiver 210, RX BB processing circuitry 225, and TX BB processing circuitry 215, in accordance with well-known principles.

Main controller 240 is capable of executing other processes and programs resident in memory 260. Main controller 240 can move data into or out of memory 260, as required by an executing process. Main controller 240 is also coupled to I/O interface 245. I/O interface 245 provides CD 110 with the ability to connect to other devices, such as laptop computers and handheld computers. I/O interface 245 is the communication path between these accessories and main controller 240. Main controller 240 may also be coupled to an input device, such as keypad 250, and display 255. The operator of client device 110 uses keypad 250 to enter data into client device 110. Display 255 may be a liquid crystal display capable of rendering text and/or at least limited graphics from web sites. Alternate examples may use other types of displays (or none). Display 255 may include a touch screen input device, which may be used in conjunction with, or in place of, keypad 250.

Client device 110 is configured to store and to use connections list 262 and timeout values table 263 in memory 260 according to the principles of the present disclosure. Main controller 240 executes OS program 261, which uses connections list 262 and timeout values table 263 to maintain persistent connections in CD 110, while reducing signaling overhead. According to an embodiment of the present disclosure, the keep-alive functions are performed in the network stack layers controlled by OS program 261, rather than by applications executed by main controller 240. In particular, the TCP functions executed by main controller 240 may be configured to maintain a system-wide list of TCP connections in connection list 262 and a table of idle duration times in timeout values table 263.

Figure 3:
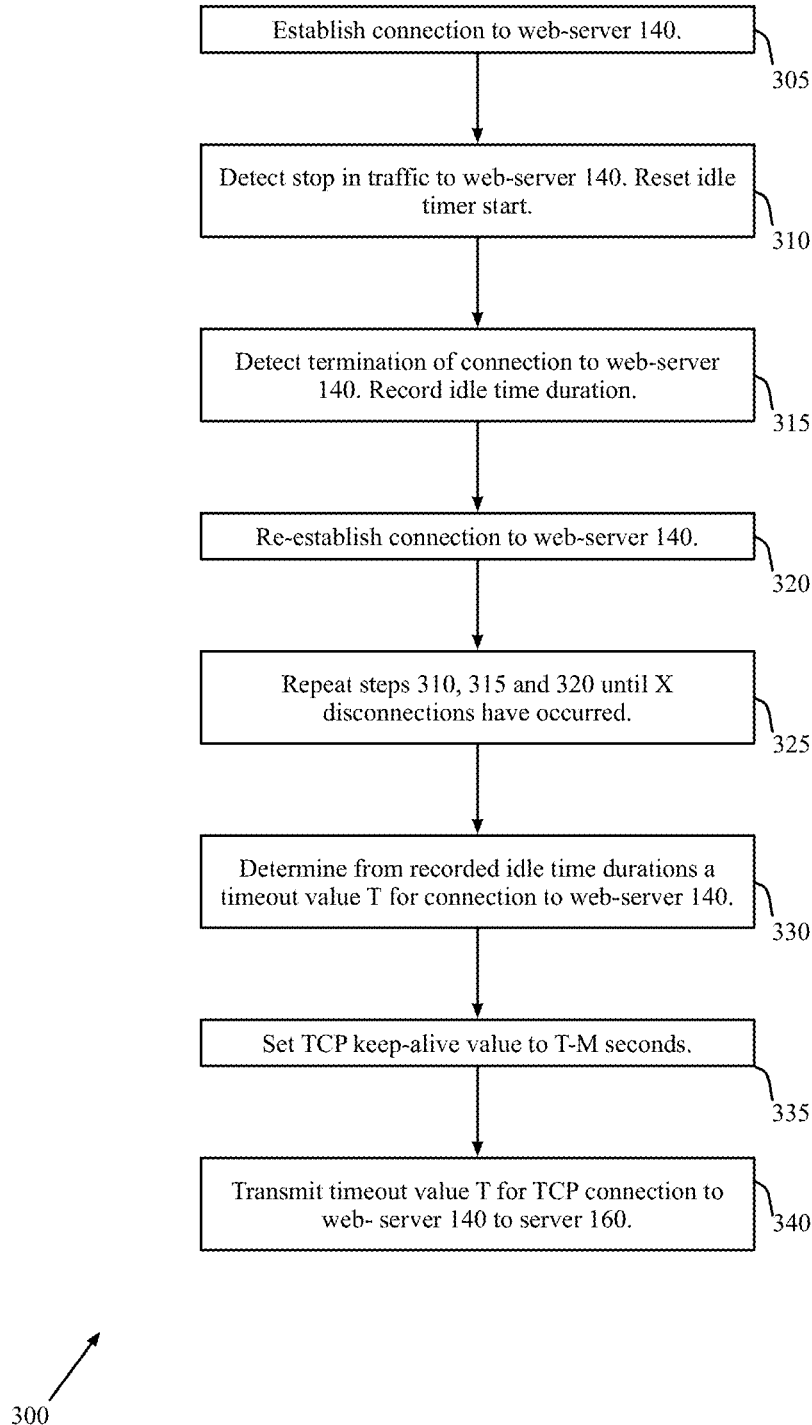
FIG. 3 is a high-level flow diagram illustrating the operation of exemplary client device according to an embodiment of the disclosure.

FIG. 3 is a high-level flow diagram illustrating the operation of exemplary client device (CD) 110 according to an embodiment of the disclosure. In the exemplary embodiment, main controller 240, under the control of OS program 261, may execute the steps in flow diagram 300. Initially, CD 110 establishes a TCP connection to web-server 140 (step 305) and will begin to exchange data traffic with web-server 140. At some point, CD 110 detect a stop in traffic to web-server 140 and reset the idle timer start (step 310). Thereafter, CD 110 may detect an unexpected termination of connection to web-server 140, at which point, CD 110 records the idle time duration of the idle timer (step 315). EU 110 then re-establishes the connection to web-server 140 (step 320).

In step 315, CD 110 may detect a termination of connection to web-server 140 in a number of ways. In some implementations, the network device terminating the connection transmits to the client device an explicit signal indicating that the termination has been connected. Thus, CD 110 may receive an explicit termination signal from web-server 140 or gateway 124 notifying CD 110 that the connection to web-server 140 has been terminated. In such a case, CD 110 records the idle time duration when the explicit signal is received.

Alternatively, if the connection is terminated without an explicit signal notifying CD 110, then the next time that CD 110 exits the idle state in order to transmit data to web-server 140, CD 110 will determine that the connection has been terminated when CD 110 receives an error message in response to a failed data transmission to web-server 140. CD 110 records the idle time duration whenever CD 110 exits the idle state. Whenever CD 110 exits the idle state and the connection has not been terminated, the idle time duration will be below the timeout value for the connection to web-server 140. Whenever CD 110 exits the idle state and the connection has been terminated, the idle time duration will be above the timeout value for the connection to web-server 140, with the exception of a limited number of spurious terminations caused by some facto other than a timeout. By comparing the sample values of idle time durations when the connection has not been terminated with the sample values of idle time durations when the connection has been terminated, CD 110 can determine the approximate timeout value associated with the connection to web-server 140. The more samples there are, the more accurate the approximate timeout value will be. Similarly, the sampling would be performed on all connections to different end-points while on the same network and the results combined.

CD 110 then repeats steps 310, 315 and 320 until X disconnections have occurred (step 325). Using the X idle time durations associated with the X disconnections, CD 110 determines from the recorded idle time durations a timeout value, T, for the TCP connection to web-server 140 (step 330). The timeout value, T, may have a margin of error of +/−S seconds. CD 110 then sets the system default TCP keep-alive value to T-M seconds, where the value M is a buffer value that ensures CD 110 transmits keep-alive packets at a periodic rate that is consistently below the timeout value, T (step 335). Finally, CD 110 may transmit to server 160 the timeout value T for the TCP connection to web-server 140 (step 340). Timeout value server 160 may then provide the timeout value T to other client devices that are connected to the same network.

Figure 4:
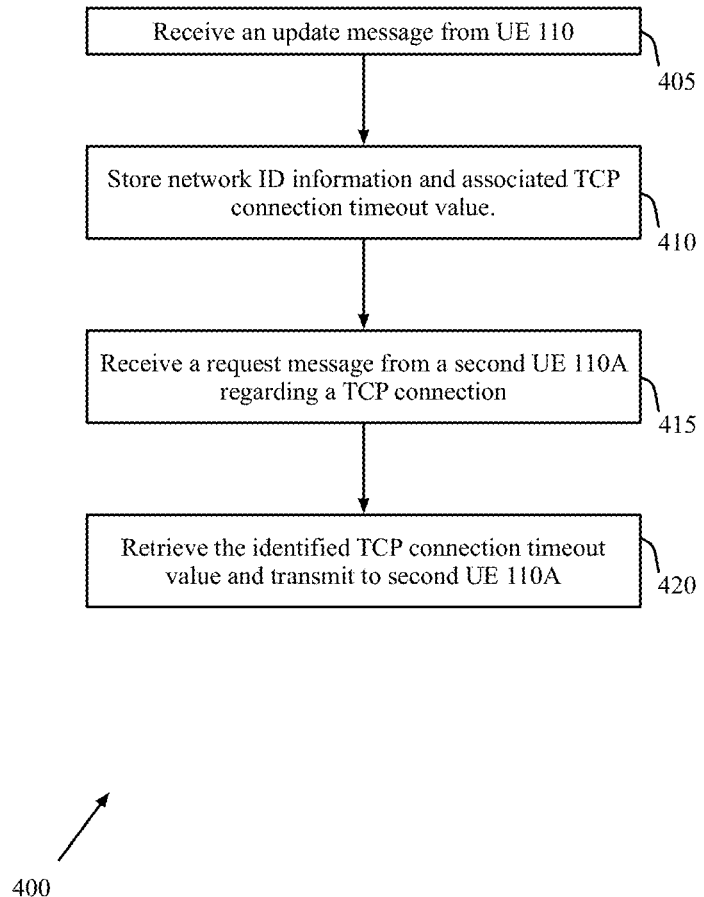
FIG. 4 is a high-level flow diagram illustrating the operation of an exemplary timeout values server according to an embodiment of the disclosure.

FIG. 4 is a high-level flow diagram illustrating the operation of exemplary timeout values server 160 according to an embodiment of the disclosure. Initially, server 160 receives from CD 110 an update message containing network-identifying information and containing a timeout value associated therewith (step 405). Next, server 160 stores the network-identifying information and the associated TCP connection timeout value (step 410). At a later point, server 160 may receive a request message from a second CD 110A regarding the identified TCP connection (step 415). In response, server 160 retrieves the identified TCP connection timeout value and transmits the identified TCP connection timeout value to second CD 110A (step 420).

In one embodiment, CD 110 may reset every so often and relearn the network timeout value. In some embodiments, this also may be done whenever CD 110 switches networks. Advantageously, CD 110 may be initialized with a relatively high NAT timeout value prior to observing and recording disconnection patterns. Statistically, this should ensure that US 110 observes that the great majority of disconnections occur at the NAT timeout interval for that network. The number of disconnection samples, X, recorded by CD 110 should be large enough to eliminate spurious disconnect events that occur infrequently.

A cellular network might be situated behind numerous firewalls and subnets. Typically, these will all be configured correctly, but they could have different NAT timeouts. Client devices that obtain a PDP context with a IP addresses in these subnets may be tracked and the discovered timeout values as described herein so that client devices accessing a network may be initialized with the likely timeout values for the network.

In an exemplary embodiment, a client device in a cellular network may receive the MCC and MNC of the current network, which are broadcast from the cell tower and identify the carrier. After obtaining a PDP context, the client connects to a specific APN for that carrier. Once a data connection is established, the client device receives the IP address and other network information (e.g., default gateway, subnet mask, etc.). The client device may obtain its external (server-reflexive) IP address using a STUN server. The client device also may obtain location and temporal information using either the network itself or other available mechanisms, such as GPS. Once the client device discovers its timeout value, the client device may publish the timeout value to timeout values server 160, along with all the various pieces of information identifying the network in which the client device is operating.

The principals of the present disclosure are not limited to cellular networks and may be extended to other types of networks as well. For example, in a Wi-Fi network, the client device may associate the timeout value with the Wi-Fi SSID, the MAC of the Wi-Fi access point or router, the external (server-reflexive) IP address of the client device or the like, along with any available location and temporal information.

Subsequently, when a second client device joins a new network, the second client device obtains the various pieces of identifying information and provides the various pieces of identifying information in a request to timeout values server 160 for network configuration. Based on the data previously gathered, timeout values server 160 may provide the timeout configuration that is the closest match for the second client device.

Timeout values gathered for a more specific network are preferred to timeout values gathered for a larger or more general network scope. For example, if timeout values server 160 gathers timeout values for the specific subnet in which the client device is operating, that is preferred to timeout values gathered for that APN, which is, in turn, preferred to timeout values gathered for a specific carrier.

Additionally, the algorithm used by timeout values server 160 for choosing the network configuration to provide to the client device may also take into account the reliability of the data based on the number of client devices that have reported in with similar values for that network segment. The algorithm used by timeout values server 160 may also take into consideration how recent the gathered information is along with other factors, including location and the like.

It should be noted that while the embodiment described above implements the timeout values control function at the TCP stack layer, those of ordinary skill in the art will readily be able to adapt the described timeout value control function at other network stack layers, including in the application layer or the sockets layer, which sits between the TCP stack and the application layer. In addition, the timeout values control function described herein may also be applied to, for example, UDP traffic. Certain NAT gateways tend to be more aggressive for UDP traffic in terms of not refreshing the connection bindings after a very small timeout window. The mechanism may be similar to a TCP connection wherein the NAT gateway does not actively terminate the connection by sending back an RST, but silently drops the IP packets instead.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A client device configured to access a remote device via a communication network, wherein the client device comprises at least one transceiver for communicating in the communication network, the client device further comprising a memory device and a microprocessor configured to execute instructions stored in the memory device such that when executed, cause the client device to:
   a) detect a first termination of a network connection to the remote device;
   b) in response to detecting the first termination of the network connection, record a first idle time duration associated with a specific subnet of the network in which the client device is operating;
   c) detect a second termination of a network connection to the remote device;
   d) in response to detecting the second termination of the network connection, record a second idle time duration associated with the specific subnet of the network;

e) determine a keep-alive value associated with the specific subnet of the network, wherein determining the keep-alive value comprises:
  determining a timeout value based upon the first idle time duration and the second idle time duration;
  determining a margin of error for the timeout value; and
  determining a buffer value having a relationship to the timeout value and the margin of error for the timeout value,
  wherein the keep-alive value is determined to be the timeout value less the buffer value; and
f) transmit, via the at least one transceiver, the determined keep-alive value and information identifying the specific subnet of the network to a network component.

2. The client device as set forth in claim 1, wherein the client device is further configured to set a transmission period of a keep-alive signal transmitted from the client device to the remote device based on the determined keep-alive value.

3. The client device as set forth in claim 1, wherein the client device detects the termination of the network connection by receiving an explicit signal indicating the network connection has been terminated.

4. The client device as set forth in claim 1, wherein the client device detects the termination of the network connection when the client device exits an idle state and attempts to transmit data to the remote device.

5. The client device as set forth in claim 1, wherein the network connection is one of a Transmission Control Protocol (TCP) connection or a User Datagram Protocol (UDP) connection and the remote device is a web-server.

6. The client device as set forth in claim 1, wherein the client device comprises a keep-alive control function that performs a)-f).

7. The client device as set forth in claim 6, wherein the keep-alive control function is implemented in one of an application layer, a sockets layer, or a network stack layer below the sockets layer.

8. The client device as set forth in claim 1, wherein the client device is one of a mobile device configured for wireless communication with a wireless network or a terminal device coupled to the communication network by a wired connection.

9. The client device as set forth in claim 1, wherein the communication network is one of a cellular network or a WiFi network.

10. The client device as set forth in claim 1, wherein the network component comprises a keep-alive value server that may be accessed by other client devices.

11. A method in a client device configured to access a remote device via a communication network, the method comprising:
  a) detecting a first termination of a network connection to the remote device;
  b) in response to detecting the first termination of the network connection, recording a first idle time duration associated with a specific subnet of the network in which the client device is operating;
  c) detecting a second termination of a network connection to the remote device;
  d) in response to detecting the second termination of the network connection, recording a second idle time duration associated with the specific subnet of the network;
  e) determining a keep-alive value associated with the specific subnet of the network, wherein determining the keep-alive value comprises:
    determining a timeout value based upon the first idle time duration and the second idle time duration;
    determining a margin of error for the timeout value; and
    determining a buffer value having a relationship to the timeout value and the margin of error for the timeout value,
   wherein the keep-alive value is determined to be the timeout value less the buffer value; and
  f) transmitting the determined keep-alive value and information identifying the specific subnet of the network to a network component.

12. The method as set forth in claim 11, further comprising setting a transmission period of a keep-alive signal transmitted from the client device to the remote device based on the determined keep-alive value.

13. The method as set forth in claim 11, wherein detecting the termination of the network connection comprises receiving an explicit signal indicating the network connection has been terminated.

14. The method as set forth in claim 11, wherein detecting the termination of the network connection comprises exiting an idle state and attempting to transmit data to the remote device.

15. The method as set forth in claim 11, wherein the network connection is one of a Transmission Control Protocol (TCP) connection or a User Datagram Protocol (UDP) connection and the remote device is a web-server.

16. The method as set forth in claim 11, wherein the client device comprises a keep-alive control function that performs a)-f).

17. The method as set forth in claim 16, wherein the keep-alive control function is implemented in one of an application layer, a sockets layer, or a network stack layer below the sockets layer.

18. The method as set forth in claim 11, wherein the client device is one of a mobile device configured for wireless communication with a wireless network or a terminal device coupled to the communication network by a wired connection.

19. The method as set forth in claim 11, wherein the communication network is one of a cellular network or a WiFi network.

20. The method as set forth in claim 11, wherein the network component comprises a keep-alive value server that may be accessed by other client devices.

21. For use in a communication network, a keep-alive value server comprising at least one transceiver for communicating in the communication network, the keep-alive server further comprising a memory device and a microprocessor configured to execute instructions stored in the memory device such that when executed, cause the keep-alive value server to:
  receive, via the at least one transceiver, from a client device a connection keep-alive value and information identifying a specific subnet of a network associated with the connection keep-alive value, wherein the connection keep-alive value has been determined by a method comprising:
    detecting a first termination of a network connection to the remote device;
    in response to detecting the first termination of the network connection, recording a first idle time duration associated with a specific subnet of the network in which the client device is operating;
    detecting a second termination of a network connection to the remote device;

in response to detecting the second termination of the network connection, recording second idle time duration associated with the specific subnet of the network; and determining from the first idle time duration and the second idle time duration the connection keep-alive value associated with the specific subnet of the network, wherein determining the keep-alive value comprises:

determining a timeout value based upon the first idle time duration and the second idle time duration;

determining a margin of error for the timeout value; and determining a buffer value having a relationship to the timeout value and the margin of error for the timeout value, wherein the keep-alive value is determined to be the timeout value less the buffer value; and store the connection keep-alive value and the information identifying the specific subnet of the network.

22. The keep-alive value server as set forth in claim 21, wherein the keep-alive value server is further configured to transmit the connection keep-alive value to a second client device in response to a request from the second client device.

23. For use in a communication network, a client device comprising at least one transceiver for communicating in the communication network, the client device further comprising a memory device and a microprocessor configured to execute instructions stored in the memory device such that what when executed, cause the client device to:

access a keep-alive value server and request from the keep-alive value server a keep-alive value associated with a specific subnet of an identified network, wherein the keep-alive value has been determined by a method comprising:

detecting a first termination of a network connection to the remote device;

in response to detecting the first termination of the network connection, recording a first idle time duration associated with a specific subnet of the network in which the client device is operating;

detecting a second termination of a network connection to the remote device;

in response to detecting the second termination of the network connection, recording second idle time duration associated with the specific subnet of the network; and determining from the first idle time duration and the second idle time duration the keep-alive value associated with the specific subnet of the network, wherein determining the keep-alive value comprises:

determining a timeout value based upon the first idle time duration and the second idle time duration;

determining a margin of error for the timeout value; and determining a buffer value having a relationship to the timeout value and the margin of error for the timeout value, wherein the keep-alive value is determined to be the timeout value less the buffer value; and receive, via the at least one transceiver, from the keep-alive value server the requested keep-alive value.

24. The client device as set forth in claim 23, wherein the client device is further configured to set a transmission period of a keep-alive signal transmitted from the client device to a remote device based on the requested keep-alive value.

* * * * *